No. 892,143. PATENTED JUNE 30, 1908.
P. DUPONT.
PROCESS OF MOLDING LARGE ARTICLES.
APPLICATION FILED MAY 18, 1905.
3 SHEETS—SHEET 2.
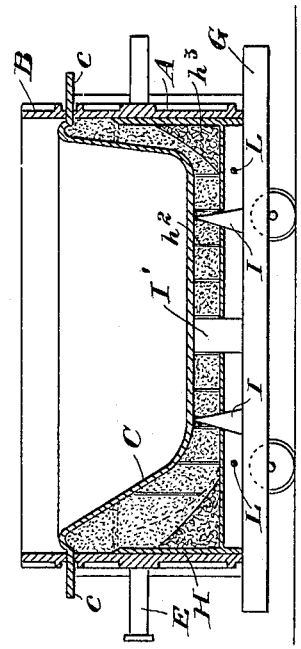
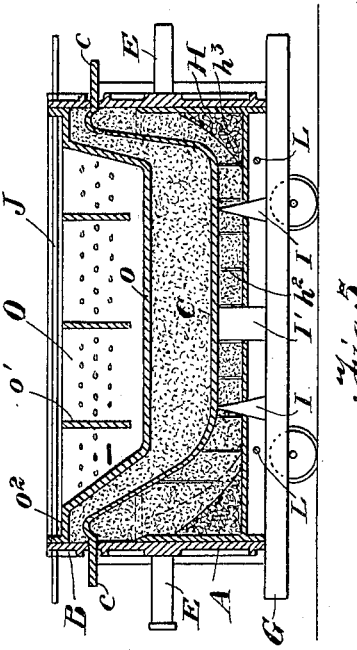
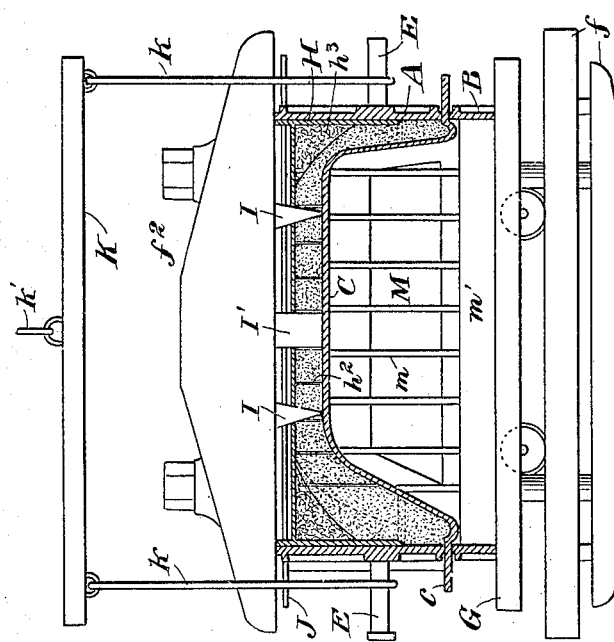
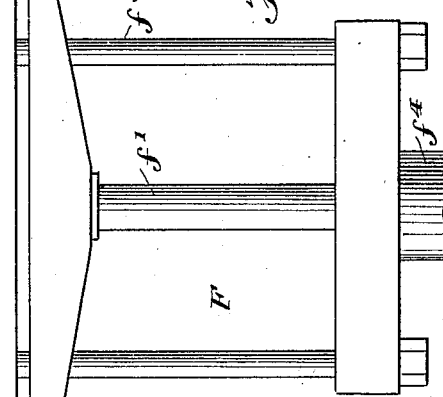
WITNESSES:
Robert Head
V. E. Nichols
INVENTOR
Paul Dupont,
BY
Griffin & Bernhard,
ATTORNEYS No. 892,143.
PATENTED JUNE 30, 1908.
P. DUPONT.
PROCESS OF MOLDING LARGE ARTICLES.
APPLICATION FILED MAY 18, 1905.
3 SHEETS—SHEET 3.
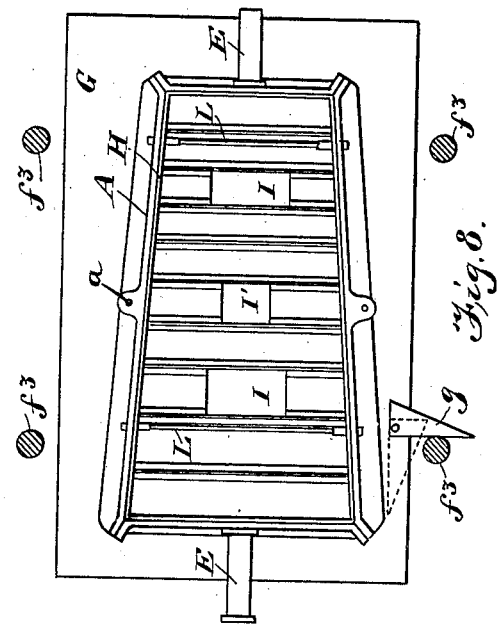
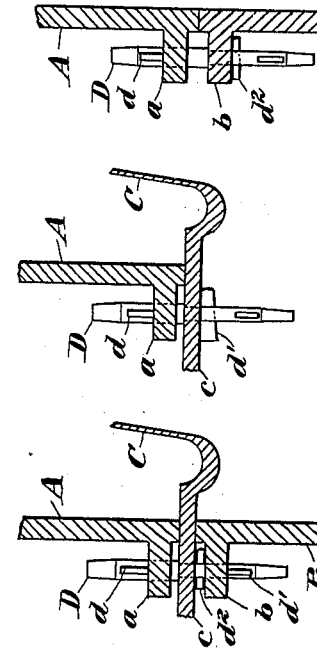
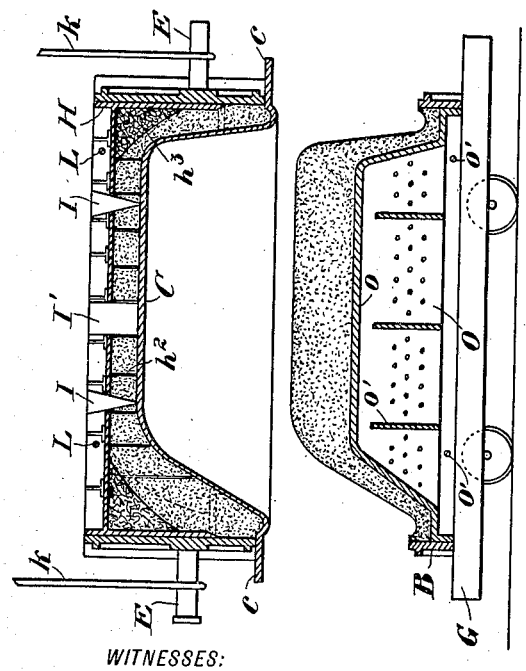
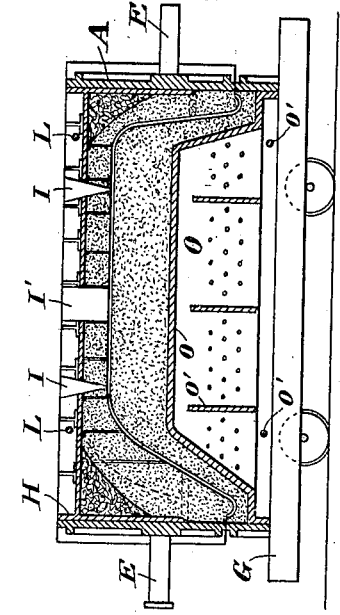
WITNESSES:
Robert Head
V. E. Nichols
INVENTOR
Paul Dupont
BY
Griffin & Bernhard
ATTORNEYS

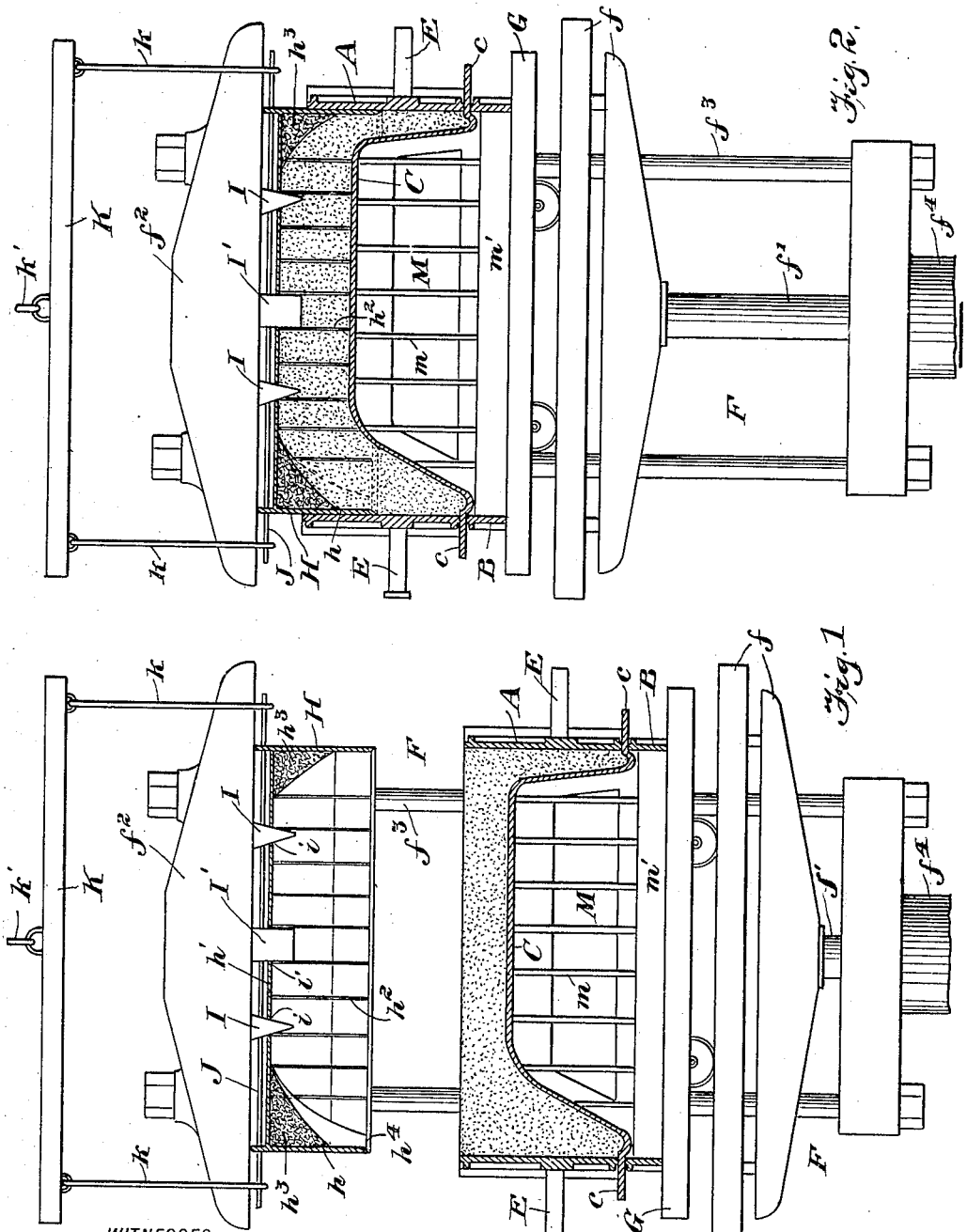

UNITED STATES PATENT OFFICE.

PAUL DUPONT, OF LE CATEAU, FRANCE.

PROCESS OF MOLDING LARGE ARTICLES.

No. 892,143.  Specification of Letters Patent.  Patented June 30, 1908.

Application filed May 18, 1905. Serial No. 261,054.

*To all whom it may concern:*

Be it known that I, PAUL DUPONT, a citizen of the Republic of France, residing at Le Cateau, Nord, in the Republic of France, have invented certain new and useful Processes of Molding Large Articles, of which the following is a specification.

My invention is a method of molding large articles, such as bath tubs, basins, and other hollow articles of manufacture.

In the operation of molding hollow articles of this character, it is very desirable to compress the sand uniformly upon or around the pattern in the molding flask; but in the methods heretofore employed in molding large hollow articles it has been impossible to do this owing to the failure of these methods to properly distribute the sand prior to the compressing operation.

According to my invention the sand in the molding flask resting upon the pattern during the operation of compressing the same is distributed uniformly prior to the compression thereof, and this distribution of the sand is followed by the application of the pressure required to compress the sand to the desired density.

My invention further consists in subjecting the sand in a two-part molding flask to pressure between a pattern and a rammer or compressor, and while the parts are under such pressure, locking the rammer or compressor to one part of the flask; the compressed sand being confined between the rammer and the pattern during the subsequent operations of molding the sand in the other part of the flask.

The invention further consists in reinforcing the pattern by a frame corresponding in profile to said pattern, to prevent it from bending during the first operation of compressing the sand between one rammer and one part of the flask; then releasing the flask from pressure, and withdrawing the reinforcing means prior to reversing the flask with the rammer and the pattern attached thereto.

The invention further consists in reversing a two-part flask, with an attached pattern and a rammer operating to confine a body of sand under pressure, from the hereinbefore described position and to bring the hitherto unused part of the flask into position for operation; then charging the unused part of the flask with sand; thereafter compressing the sand between the pattern and a second rammer or compressor; locking the last named rammer to the second part of the flask while the parts are under pressure, and releasing the flask with the attached pattern and compressors from pressure.

By my method it is possible to obtain a regular and proportionately distributed pressure on the sand in the respective parts of the flask. I have been able to compress the sand to about fifty (50) per cent. of its original volume under a pressure of three (3) kilograms per square centimeter.

In the annexed drawings, I have illustrated one form of apparatus suitable for carrying my process into effect, but it will be understood that other kinds of apparatus may be employed.

Figure 1 is a sectional elevation illustrating a two part flask, and a suspended rammer or compressor in their first positions and in coöperative relation to the head and a platform of a power press. Fig. 2 is a sectional elevation of the same parts shown by Fig. 1, illustrating the second positions of the parts, wherein the rammer or compressor enters the cope of the flask and operates on the sand therein to displace or distribute the sand preliminarily to compression of a charge of sand between said rammer or compressor and one side of a pattern. Fig. 3 is a similar sectional elevation illustrating the third position of the parts, wherein the rammer enters the cope of the flask for its full distance and the sand is compressed uniformly and to a desired density between one side of the pattern and said rammer. Fig. 4 is a sectional elevation illustrating the two part flask in an inverted position, the pattern and the rammer being attached to said flask and holding the charge of material in a compressed condition. Fig. 5 is a sectional elevation with the flask and the attached parts in the inverted positions of Fig. 4, but showing a charge of sand compressed against the other side of the pattern and confined in the flask by a second rammer or compressor, which is locked to the drag of said flask. Fig. 6 is a sectional elevation showing the cope of the flask with the pattern and first compressor suspended, the drag and the second charge of sand being withdrawn from the pattern in a position free from said pattern. Fig. 7 is a sectional elevation showing the cope and drag of the flask with their attached compressors or rammers and with their respective charges of molded sand in matched positions, the several parts being assembled for the casting operation. Fig. 8 is a plan view of the flask in position on the platform of a press, illustrating a guide device for the flask coöperating with one of the uprights of the press, in order to center the flask therein. Figs. 9, 10 and 11 are detail sectional elevations showing means for locking a pattern in fixed position between the parts of a flask, and for locking said parts of the flask to each other, as required in the operations of molding the sand and assembling the flask for the casting operation.

In carrying my invention into practice, I employ a two part flask, the cope or upper member of which is indicated at A, and the drag or lower member at B. These parts of the flask may be of any suitable construction, dimensions and material, and they are adapted to be assembled into registering or matching relation, and to be locked directly together or with an interposed pattern C of the hollow article, which it is desired to cast. As shown, the cope A is considerably deeper than the drag B, for the purpose of receiving the body or major portion of the pattern C. This pattern may be of wood, metal, or other suitable material, and it corresponds in shape to the article which it is desired to cast, said pattern being shown as having a marginal flange $c$, which is adapted to fit between the edges of the drag A and cope B, so as to project outside of the flask. Said marginal flange of the pattern C is somewhat thinner than the walls of the pattern and, furthermore, said flange $c$ is perforated at suitable intervals. The perforations of the flange register with similar perforations in lugs or ears $a$, $b$, of the parts A, B, of the flask, and through these alined openings are adapted to pass a suitable number of bolts or pins D, see Figs. 9, 10 and 11. Each bolt or pin is slotted for the reception of keys $d$ $d'$, adapted to engage with the lugs $a$, $b$, of the respective parts of the flask, and each pin or bolt is furthermore provided with an opening for the reception of a cross pin $d^2$, adapted for engagement with the flange $c$ of the pattern C, as indicated by Fig. 9, or with a lug of one part of the flask as in Fig. 11. A suitable number of the pins or bolts D are used for holding the members of the flask with an interposed pattern between said members as in Fig. 9, in certain of the operations of molding the sand, or these pins or bolts may be used for attaching the pattern to the cope A, of the flask as in Fig. 10, when the drag and one molded part of the sand is withdrawn from the cope, or the pin or bolts may be used for connecting or locking the members A B of the flask directly to each other, as in Fig. 11, in another of the operations of casting the article.

The flask A is reversible with reference to a power press, the latter being indicated in Figs. 1, 2 and 3, and for the purpose of reversing or inverting the flask, it is provided with trunnions E on the cope A, whereby said flask may be suspended within a press. I have illustrated the flask as being adapted for use in connection with a hydraulic press F, the platform $f$ of which is adapted to be forced by a piston $f'$ toward the press head $f^2$. This head is connected with other parts of the press by suitable rods or upright members $f^3$, and the piston rods $f'$ of said press operate in a piston cylinder $f^4$.

The flask is adapted to rest upon the suitable wheeled truck G, which may be run upon the platform $f$, or it may be moved bodily away from the press, as required. This truck G is centered on the platform of the press F by a suitable detent $g$, the same being represented by Fig. 8, as engaging with one of the rods or uprights $f^3$ of the press. The detent is pivoted to the truck G, so as to be foldable thereon to the dotted line position indicated in Fig. 8, thus permitting the truck with or without its load to be run upon or off the press, but in the operation of moving the truck and its load on the press platform, the detent $g$ should be turned outward to the full line position of Fig. 8, in order that said detent may engage with one of the press rods $f^3$, so as to center the truck and the flask on the press platform. This detent does not interfere with the rising and falling movement of the platform or the flask, because it is adapted to slide along the press rod $f^3$ when the press is operated to raise the flask toward the head $f^2$, or to withdraw said flask from said head.

One of the early steps of my process consists in molding the sand in the cope A of the flask, and this step of the process contemplates charging the sand into the cope and upon the pattern, and thereafter displacing the sand laterally with respect to the walls of the pattern for the purpose of distributing the sand to a uniform depth over the pattern, and finally compressing the sand between the flask and the compressor.

With the cope A is adapted to coöperate a rammer or compressor indicated at H, the interior contour of said rammer corresponding to the profile of the pattern, and said rammer being adapted to enter the cope A when the parts are brought together by a relative movement of the flask to the compressor, or vice versa. This compressor is shown as consisting of a frame $h$, a top plate $h'$, and a plurality of internal ribs $h^2$. The ribs are arranged longitudinally and transversely within the frame $h$ and against the under side of the plate $h'$, said ribs being suitably attached to the frame and the plate, and extending lengthwise and transversely of the compressor. The active surface of the compressor is formed by a suitable filling $h^3$, the frame $h$, and the plate $h'$, said filling consisting of cement or other material which occupies the corners or angles of the frame. The interior contour of the rammer or compressor conforms to the profile of the pattern, and the ribs $h^2$ protrude slightly beyond the filling $h^3$, for the purpose of holding the sand during the compression thereof. The dimensions and shape of the frame $h$ of the compressor correspond to the internal dimensions of the cope A, in order that the compressor may enter said cope, and the lower edge of the frame $h$ is beveled or inclined to a sharp edge as at $h^4$, whereby the edge is adapted to cut the sand away from the walls of the cope A during the period that the compressor enters said cope. The compressor is, furthermore, provided with suitable openings $i$ $i'$ in the top plate $h$, and these openings $i$ are adapted to be occupied by suitable pouring gates I, while the opening $i'$ is adapted to be occupied by a vent I', or the gates and the vent may be removed and suitable temporary formers may be substituted therefor. The filling $h^3$ terminates above the edge $h^4$, to leave a free space at the lower open part of the compressor, so that on the entrance of the compressor into the cope, the sand is forced away from the wall thereof by the edge $h^4$, and the lower part of the compressor frame $h$, whereby the sand is displaced and distributed uniformly over the pattern before the sand is compressed between the compressor and said pattern.

The compressor is adapted to be suspended in a firm position against the under side of the press head by a rod J, the same passing through suitable openings which are provided in the ends of the frame $h^3$, above the plate $h'$, said rod J also passing through the pouring gates and the vent, as shown. The ends of the rod protrude beyond the compressor, and they are engaged by suitable links or hooks $k$, which are attached to a suspension bar K, and from this bar leads a suitable cable $k'$ adapted to be coiled on a power windlass, or the cable may be connected with any other suitable contrivance for its operation. After connecting the links $k$ to the rod J, the windlass is operated to draw the cable taut and make the rod J hold the compressor firmly against the under side of the press head $f^2$.

It is found that the pattern C when subjected to the pressure required to compress the sand will bend and become misshapen. To overcome this objection, I contemplate the employment of a reinforcing frame M, which is placed within the flask in a position to have engagement with the under side of the pattern. This reinforcing frame is shown by Figs. 1, 2 and 3 as consisting of suitable ribs $m$, attached to a base $m'$, said ribs corresponding in profile to the contour of the pattern C on the under side thereof. The base of the frame is adapted to rest on the truck G, and within the drag B of the flask, while the ribs or members $m$ of said reinforcing frame have engagement with the pattern at numerous lines throughout its length and width. The frame M is used in connection with the flask in the pattern during the operation of molding the sand in the cope A, and this frame is adapted to be removed from the flask and the truck during the subsequent operations of molding the sand in the drag, as will hereinafter appear.

Before charging the cope with sand, the truck G and the flask are run on the press platform, and centered below the suspended compressor, the reinforcing frame being in position within the flask and in engagement with the pattern. The platform and its contained parts are now run up to the compressor to insure accuracy in the position of said compressor relative to the cope. The platform is now lowered, the cope A filled with sand, and the platform again raised. When the flask is raised to the position indicated by Fig. 2, the compressor enters the flask about one half the depth thereof, more or less, and the beveled edge $h^4$ of the compressor operates on the sand to force it away from the walls of the flask and toward the pattern, said compressor being accurately guided into position into the cope A by the walls thereof. A further upward movement of the press and the flask causes the compressor to enter fully into the cope to the position shown by Fig. 3, and during the latter part of this movement of the flask the sand therein is compressed between the compressor and the pattern, the volume of the sand being reduced fully 50% and the sand being compressed uniformly over the surface of the pattern. The next step in the operation consists in locking the compressor H within the cope A for the purpose of confining the sand between the pattern and said compressor during the subsequent stages of the process, and this locking of the compressor to said flask is secured by the employment of suitable locking members, such as the rods L, which are adapted to pass through the wall of the compressor above the plate $h'$ thereof and through the wall of the cope A, see Fig. 4.

The links $k$ are now disengaged from the rod J, and the suspension bar K is lowered to have engagement with the trunnions E of the flask substantially as shown by Fig. 3. The platform $f$ of the press is lowered, and the reinforcing frame M is thereby withdrawn from the drag and the pattern, the flask being suspended below the head of the press by the links $k$ and the bar K. The next step in the process consists in molding the sand within the drag B of the flask, and at this stage of procedure I employ a second compressor or rammer O. Before placing the rammer O in position to enter the flask, the bar K and the links $k$ are lowered sufficiently for the flask to be inverted, the trunnions E turning within the links $k$, so that the flask will assume the position and be lowered upon the truck G, as shown by Fig. 4, the pattern C and the compressor H remaining attached to the flask and being inverted therewith.

The compressor O corresponds to the internal contour of the pattern C, and it has a wedge shaped or approximately coniform body $o$, which is reinforced by internal webs or ribs $o'$ and is provided with a marginal flange $o^2$, the body $o$ being perforated, substantially as indicated by Figs. 5, 6 and 7. The rammer O is adapted to be placed against the under side of the press head, and to be suspended in position against the same by the rod J, the latter passing through the marginal flange of said compressor and having engagement with the links $k$ of the suspension bar K. With the flask and its attached parts on the truck G in the position shown by Fig. 4, the truck is run upon the press platform beneath the suspended rammer O, and the press is operated to raise the platform $f$, the truck and the flask, so as to center the compressor O within the drag B, thus insuring accurate relationship between said compressor O and the drag. The platform is again lowered to withdraw the drag from the compressor, and the flask is charged with sand until it fills the pattern and said drag. The press is again operated to raise the flask and causes the compressor O to enter the drag and the pattern, the upward movement of the flask being continued until the compressor O enters the flask and the pattern to the position shown by Fig. 5. The sand is thus compressed between the hollow side of the pattern and the male compressor O, and said compressor is now locked to the drag B, so as to confine the sand between the pattern and said compressor, any suitable locking devices, such as the pins $O'$, being employed for locking the compressor to said drag, see Figs. 6 and 7.

The male compressor having been locked with the flask, the suspension bar K is lowered while the press head and the truck are in their raised positions, thus releasing the suspension rod J and permitting the links $k$ to be connected with the trunnions E of the flask. The press platform and the truck are now lowered, but the flask and its attached parts are suspended against the under side of the press head, by the links $k$ of the suspension bar. The flask is now again inverted so as to restore the parts to their normal positions, and the suspension bar is raised for the purpose of drawing the cope A and the female compressor H against the press head. The next step in the process consists in opening the flask and withdrawing the pattern from the molded sand contained in the drag and cope, respectively. In performing this operation the press platform and a truck as G are run up for the truck to receive the drag B and the compressor O together with the molded sand thereon. The keys $d'$ are removed from the bolts D and the drag is thus unlocked from the pattern and the cope, after which the press platform is lowered so as to withdraw one molded body of sand from the pattern and with it the drag B and the male compressor O; the cope A, the pattern C, the compressor H and the other molded body of sand remaining suspended from the press head in the position shown by Fig. 6. The truck with the drag and its associated parts are now run off the press and another truck is run on to the press platform which is again raised so as to bring the last mentioned truck into position for receiving the pattern C. This pattern is struck lightly in order to free it from the sand in the cope, and said pattern is deposited upon the second truck, the latter being lowered with the press platform while the cope, the sand therein and the compressor remain suspended. The second truck with the pattern is removed away from the press and the truck H containing the drag B, compressor O and sand, is run back into position on the press platform, and the latter with its load is raised so as to bring the two parts of the flask and the two bodies of molded sand into matching relation. The parts of the flask are now locked together by the bolts D, as represented by Fig. 11, and the assembled flask is removed from the press.

It should be remarked that after molding the sand in the cope A, between the pattern and the female compressor H, and after the flask shall have been lowered from the suspended position of Fig. 3, the pouring gates I, I, and the vent I' become accessible. These parts can be removed temporarily and replaced by solid wooden plugs of the same shape as the openings left in the sand. Sand is now built up by hand around the plugged holes, up to the level of the upper edge of the compressor H, which is level with the flask, the wooden plugs being then removed. After molding the sand in the cope and in the drag, air holes are pricked in each body of molded sand by means of a molder's needle, the same being introduced through the perforated portions of the compressors H and O. These holes provide for the exit of gases during the casting operation. When the two bodies of molded sand, the parts A, B, of the flask, and the compressors H, O, shall have been assembled as shown by Fig. 7, the two parts of the mold are locked together, and the mold is ready for casting, the metal being poured through the gates, as in the ordinary operation.

Having thus described my invention, what I claim as new and desire to secure by Letters Patent is:—

1. The process of molding which consists in charging sand upon a pattern within a flask, then distributing the sand uniformly over the pattern by means of a compressor which displaces the sand laterally of the walls of the flask without compressing the sand on the pattern, subsequently compressing the sand between the pattern and said compressor, and retaining said compressor within the flask and in engagement with the compressed sand until the casting operation is completed.

2. The process of molding which consists in charging sand upon a pattern within a flask, then displacing the sand laterally of the walls of the flask, so as to distribute said sand uniformly over the pattern without compressing the sand against said pattern, thereafter compressing the sand between the said pattern and the compressor, supporting the compressed sand by a member separate from the flask until the casting operation is completed, and withdrawing the pattern from the flask.

3. The process of molding which consists in charging sand upon a pattern within a flask, then distributing the sand in uniform depth over the pattern by means of a compressor introduced within the flask and operating to displace the sand laterally of the walls of said flask, then compressing the sand against the pattern by the said compressor, and retaining the compressor within the flask, so as to act as a support for the compressed sand, until the casting operation is completed.

4. The process of molding which consists in charging sand upon a pattern held in a flask; suspending a rammer or compressor over the flask; closing the parts by a relative movement of one to the other and making the compressor displace the sand to a uniform depth over the pattern; compressing the sand between the pattern and the compressor by a further relative movement of the flask and the compressor; and locking the compressor to the flask.

5. The process of molding which consists in depositing sand upon a pattern within a flask; arranging a compressor in the path of the flask; forcing the compressor into the flask and compressing the sand between the pattern and the compressor; and locking the compressor to the flask.

6. The process of molding which consists in charging sand upon one side of a pattern within a flask, placing a supporting device within the flask and beneath the other side of the pattern for sustaining said pattern independent of the flask, compressing the sand against the first named side of the pattern, and then withdrawing the supporting device.

7. The process of molding which consists in depositing sand on one side of a pattern within a two part flask; reinforcing the other side of the pattern against bending under pressure by a reinforcing device placed within the drag and disconnected from the flask; compressing the sand against one side of the pattern, removing the reinforcing device which supported the pattern; reversing the flask; filling the other part of the flask by depositing sand on the other side of said pattern; and then compressing the sand in the last mentioned part of the flask.

8. The process of molding which consists in depositing sand upon a pattern within one of the members of a two-part flask, compressing the sand against the pattern by forcing a compressor into said member of the flask, locking said compressor to the member of the flask, withdrawing the pattern from the flask member, depositing sand upon the complementary part of said pattern confined in the second member of the flask, compressing the sand against said pattern by forcing a second compressor into the second member of the flask, locking the second compressor to said second member of the flask, withdrawing the pattern from the second flask member, and assembling the two flask members with the respective molds in register.

9. The process of molding which consists in compressing a charge of sand between one side of a pattern and a compressor within a two part flask; locking the flask and the compressor in fixed relation to each other; inverting the flask with the molded charge confined between the pattern and the compressor; compressing another charge of sand between the other side of the pattern and a second compressor; locking the flask and the second compressor to each other; again inverting the flask; separating the two parts of the flask; withdrawing the pattern; assembling the two parts of the flask; and then casting between the molded bodies of sand while they are confined within the parts of the flask by the compressors attached to the respective parts.

10. The process of molding which consists in compressing a charge of sand within one part of a flask between one side of a pattern and a compressor; reinforcing the other side of the pattern against bending under the pressure; locking the compressor to one part of the flask; inverting the flask and withdrawing the reinforcement for the pattern; then compressing another body of sand in the other part of the flask between a second compressor and the other side of the pattern; locking the second compressor to the second part of the flask; again inverting the flask; opening the flask; withdrawing the pattern; and finally assembling the two parts of the flask to bring the molded bodies of sand into matching relation.

11. The process of molding which consists in charging sand upon a pattern within a flask, inserting a compressor part way into the flask for the purpose of displacing the sand laterally of the walls of the flask and distributing it uniformly over the pattern without compressing it against the pattern, subsequently compressing the sand against the pattern by bringing said compressor closer to the pattern, and supporting said compressed sand until the casting operation is completed.

12. The process of molding which consists in charging sand upon a pattern within a flask, displacing the sand and uniformly distributing it over a pattern without compressing it against said pattern by means of an initial movement of a compressor within the flask, subsequently compressing the sand against the pattern by further travel of the compressor toward the pattern, and allowing the compressor to remain within the flask until the casting operation is completed.

13. The process of molding which consists in charging sand upon a pattern within a flask, displacing the sand laterally of the walls of the flask and distributing it by means of a compressor over the pattern without compressing it against the pattern, subsequently compressing the sand against the pattern by bringing the said compressor closer to the pattern, and then locking the compressor to the flask.

In testimony whereof I have signed my name to this specification in the presence of two subscribing witnesses.

PAUL DUPONT.

Witnesses:
   GEORGES BRAUN,
   GUSTAVE LEGROUN.